D. PORTER.

Straw Cutter.

No. 1,892. Reissued Feb. 28, 1865.

WITNESSES

W. H. Burridge

J. Holmes

INVENTORS

Dary Porter

K. Smith

N. PETERS, Photo-Lithographer, Washington, D. C.

UNITED STATES PATENT OFFICE.

D'ARCY PORTER AND K. SMITH, OF CLEVELAND, OHIO, ASSIGNEES OF D'ARCY PORTER.

IMPROVEMENT IN STRAW-CUTTERS.

Specification forming part of Letters Patent No. 43,459, dated July 5, 1864; Reissue No. 1,892, dated February 28, 1865.

*To all whom it may concern:*

Be it known that I, D'ARCY PORTER, of Cleveland, in the county of Cuyahoga and State of Ohio, assignor to myself and K. SMITH, have invented new and useful Improvements in Hay and Straw Cutters; and I do hereby declare that the following is a full and complete description of the construction and operation of the same, reference being had to the accompanying drawings, making a part of this specification, in which—

Figure 1:
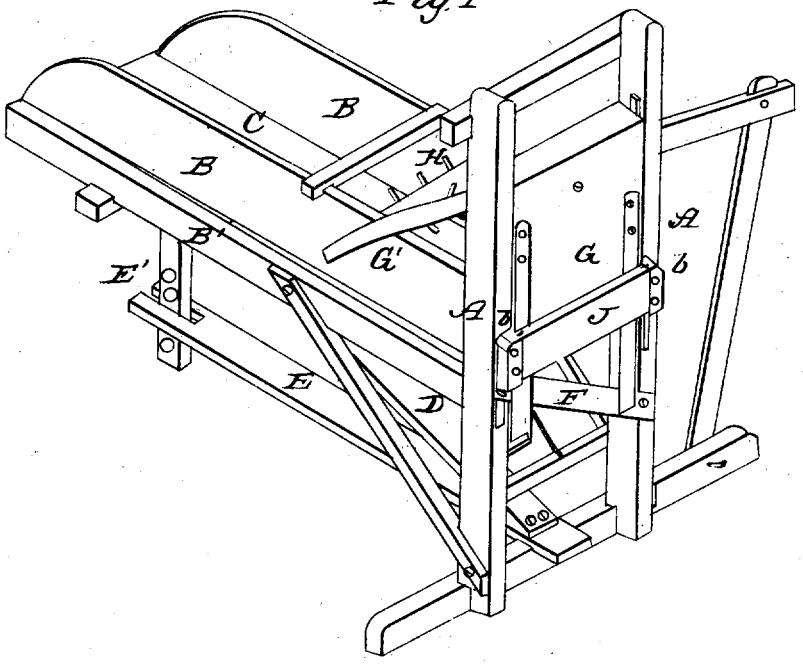
Figure 2:
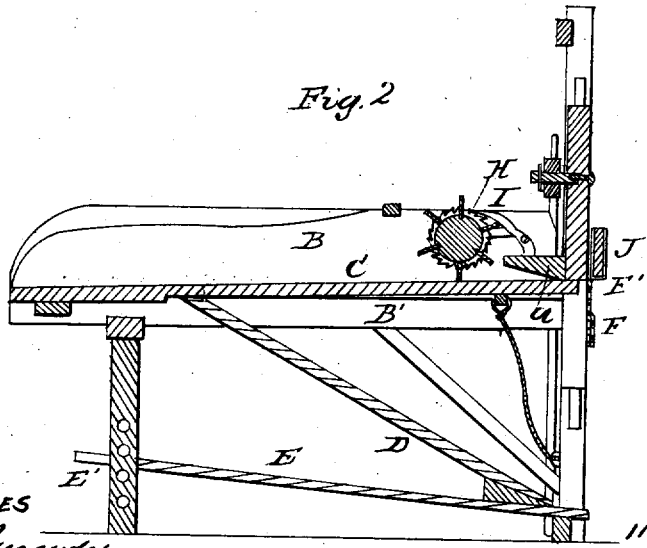

Figure 1 is a perspective view, and Fig. 2 is a vertical longitudinal section.

Like letters refer to like parts in the two views.

My invention relates to such a construction that the bottom board of the cutting-box or the entire box will move up and down to correspond with the motion of the knife and feeding devices.

A represents the stationary part of the frame; B, the straw and hay box, and B′ stationary side pieces of the same.

C is the bottom board, which is mounted upon a spring, D E, or its equivalent, the sections D E operating as one spring. The side pieces, B B, may be connected to the bottom board, C, so as to form an entire box, and vibrate the same as the board C in connection with the cross-head and lever, thus making a vibrating cutter-box in place of the board C.

F represents the stationary shear, which is secured to the stationary frame A. The moving knife F′ is secured to the sliding cross-head G, which is vibrated by means of the lever G′. Upon the inside of the cross-head G is a pressure-board, *a*, which is attached to the cross-head and moves with it. This is beveled upon the under side to freely admit the straw.

H represents a feed-roller the journals of which are in the side pieces, B. It is operated by a pawl and ratchet, I, as represented. The spring E can be graduated to different degrees of pressure by pins E′.

In the operation of this machine the straw is pressed between the bottom board, C, and the pressure-board *a*, and is fed to the knife by the pawl and ratchet, or its equivalent, from the box. Every downward stroke of the lever G′ carries with it the cross-head, bottom board, or box and straw, giving the spurs on the feed-roller a new hold upon the straw. The length of the cut is regulated by a gage-plate, J, in front of the moving knife. This plate is adjustable by placing it in different grooves, as shown at *b b* in Fig. 1.

Instead of the feed-roller a rake may be so hung, connected to the feed-box, as to be operated in connection with the cross-head, causing the hay or straw to be fed to the knife by the joint action of said cross-head and rake.

What we claim as my improvement, and desire to secure by Letters Patent, is—

1. The spring D E, or its equivalent, knife F′, and vibrating box or board, when arranged and operating substantially as and for the purpose set forth.

2. The gage-plate J and box B, in combination with the knife F′ and spring D E, as and for the purpose hereinbefore described.

D'ARCY PORTER,
K. SMITH.

Witnesses:
W. H. BURRIDGE,
J. HOLMES.